June 15, 1965 B. H. BELL 3,189,758
ISOLATING AND PULSE-PRODUCING CIRCUIT
Filed July 23, 1962
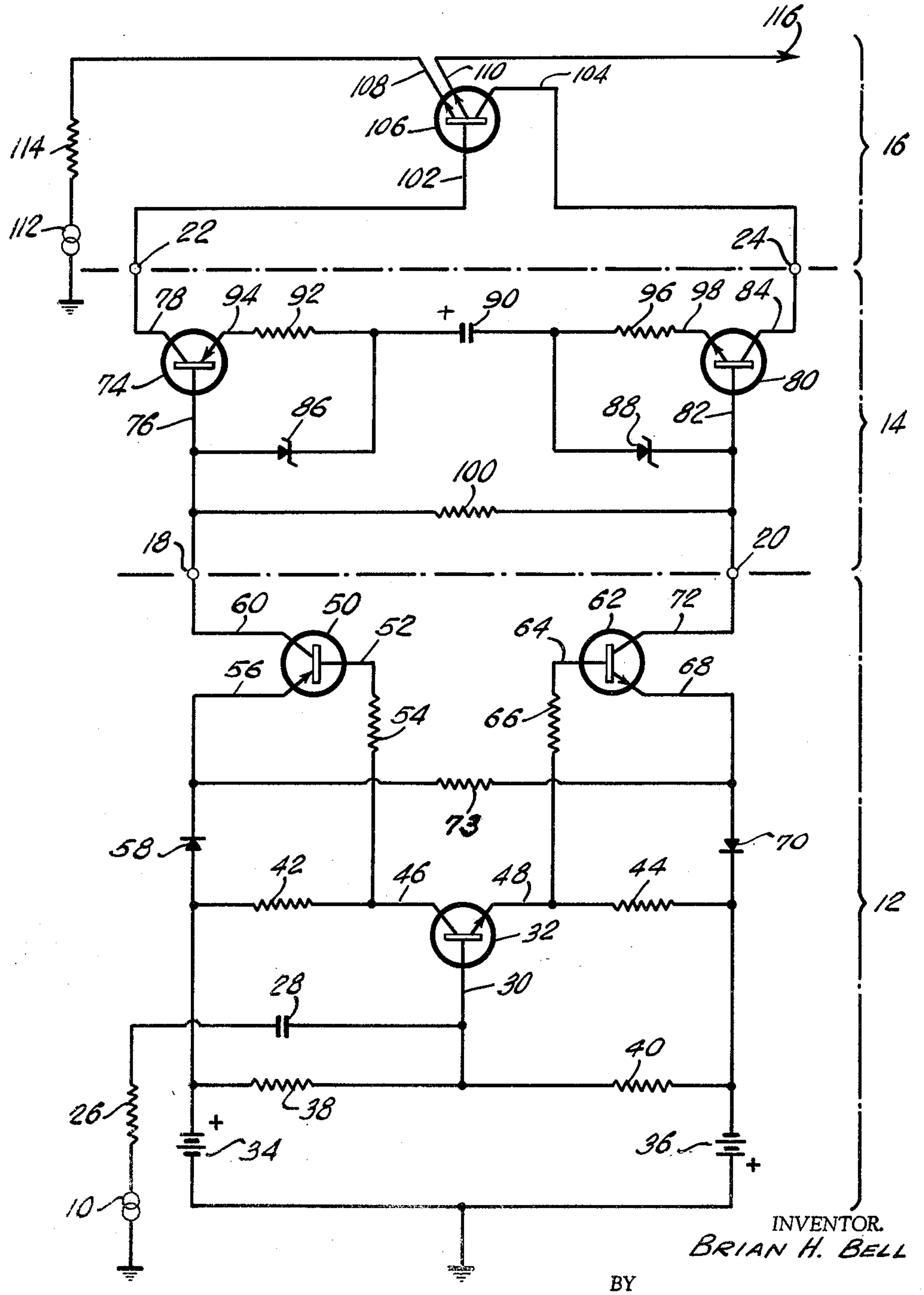
INVENTOR.
BRIAN H. BELL
BY
Curtis, Morris & Safford
ATTORNEYS.

United States Patent Office 3,189,758
Patented June 15, 1965

3,189,758

ISOLATING AND PULSE-PRODUCING CIRCUIT

Brian H. Bell, Bethel, Conn., assignor to National Semiconductor Corporation, Danbury, Conn.

Filed July 23, 1962, Ser. No. 211,528
5 Claims. (Cl. 307—88.5)

This invention relates to electrical switching circuits. More particularly, this invention relates to circuits for supplying switching signals to an output electrically isolated from the circuit's input.

In many electrical systems there is need for a circuit which will produce a pulsating output signal while at the same time providing electrical isolation of the circuit's output terminals from other components of the system. For example, in some electrically-operated switching circuits it is desirable for the source of switching signals to be electrically isolated from the switch. This is especially true in some transistorized "chopper" or interrupting circuits where it is necessary for the source of switching signals to be electrically isolated from each of the transistors used as switches.

Prior methods of providing the desired isolation in these switching circuits include the use of a transformer to couple the switching source to the switches. One disadvantage of this arrangement is that a transformer must be specially designed in order to operate within a relatively wide range of switching signal frequencies, thus making such a circuit designed for wide-band operation expensive to produce. A further disadvantage of such transformer coupling is that the capacitance between the primary and secondary windings of the transformer is likely to cause troublesome transient currents to flow in the switch. Compensating for this capacitance adds further cost to the circuit.

Accordingly, an object of this invention is to provide an electrical circuit for supplying switching signals at an output electrically isolated from the circuit's input.

Another object is to provide such a circuit which is effectively operable over a wide range of switching frequencies, has a minimum of capacitive coupling between its output and input, and is reliable and relatively inexpensive to produce.

These and other objects and features of the invention may be more fully understood from the following description and drawing.

The basic components of the illustrated embodiment of the isolating and pulse-producing circuit of this invention are a switching signal source 10, a gating circuit 12, and a control circuit 14. A load circuit is indicated generally at 16.

The gating circuit 12 produces a gating signal at its output terminals 18 and 20 when the switching signal voltage has one value, and presents an essentially infinite impedance at terminals 18 and 20 when the switching signal voltage changes to a second value. The control circuit 14 stores the energy of the gating signals when they are received from the gating circuit and at the same time presents an essentially infinite impedance to the input terminals 22 and 24 of the load circuit 16. When the value of the switching signal is reversed and a gating signal is no longer produced at terminals 18 and 20, the control circuit 14 discharges the stored gating signal energy into the load circuit 16 in the form of a direct current signal which has a substantially constant value for a calculated length of time.

The above isolating and pulse-producing circuit delivers to the load circuit direct current signals corresponding to those generated by the switching signal source, while at the same time conductively isolating the load circuit from the signal source and minimizing capacitive connection between the load circuit and the signal source.

The grounded switching signal source 10 is connected through a coupling resistor 26 and a capacitor 28 to the base terminal 30 of an n-p-n type junction transistor 32. When the source 10 produces no pulse at all, transistor 32 is biased in the forward direction by the voltage divider network consisting of grounded and series-connected direct current power supplies 34 and 36 together with voltage-dividing resistors 38 and 40. Bias resistor 42 is connected between the collector 46 of transistor 32 and the positive terminal of power supply 34. Similarly, bias resistor 44 is connected between emitter 48 of transistor 32 and the negative terminal of power supply 36. When transistor 32 is in this forward-biased condition, a substantial current flows from the power supplies 34 and 36, through the collector-emitter junction of transistor 32, and through bias resistors 42 and 44.

P-n-p transistor 50 has its base terminal 52 connected through current limiting resistor 54 to the collector 46 of transistor 32, and has its emitter 56 connected through a silicon junction diode 58 to the positive terminal of power supply 34. The collector 60 of transistor 50 is connected to output terminal 18 of the gating circuit 12. Similarly, n-p-n transistor 62 has its base terminal 64 connected through current limiting resistor 66 to the emitter 48 of transistor 32, and has its emitter 68 connected through silicon junction diode 70 to the negative terminal of power supply 36. The collector 72 of transistor 62 is connected to output terminal 20 of gating circuit 12. A resistor 73 having a high resistance is connected between the emitters 56 and 68 of transistors 50 and 62.

The current flowing through resistors 42 and 44 when transistor 32 is forward biased creates a voltage drop across each resistor which is applied between the emitter and base of transistors 50 and 62 and biases both transistors in the forward direction. When transistors 50 and 62 are thus forward biased, there is an essentially short circuit between terminal 18 and power supply 34, and another such path between terminal 20 and power supply 36.

In the control circuit 14, a p-n-p transistor 74 has its base terminal 76 connected to output terminal 18 of gating circuit 12, and its collector 78 to load terminal 22. Similarly, n-p-n transistor 80 has its base terminal 82 connected to output terminal 20 of gating circuit 12, and its collector 84 to load terminal 24.

Zener diode 86 has its anode connected to terminal 18 them to conduct current to charge storage capacitor 90. The cathode of diode 86 is also connected to a current limiting resistor 92, which is connected to the emitter 94 of transistor 74. Zener diode 88 has its anode connected to the other side of capacitor 90 and to a current limiting resistor 96, which is in turn connected to the emitter 98 of transistor 80. The cathode of diode 88 is connected to terminal 20 of gating circuit 12. A bias resistor 100 having a relatively high resistance is connected between terminals 18 and 20.

When transistors 32, 50, and 62 are forward biased, a positive voltage signal appears at terminal 18 and a negative signal at terminal 20. These signals bias Zener diodes 86 and 88 in the forward direction and cause them to conduct current to change storage capacitor 90. (The resistance of resistor 100 is large when compared with the impedance of the path through the Zener diodes and therefore resistor 100 conducts only a small amount of current.) At the same time, the voltage drops across diodes 86 and 88 create a reverse bias for each of the emitters of transistors 74 and 80, causing these transistors to cut-off and present an essentially infinite impedance at terminals 22 and 24.

Thus, when no switching signal is received at the base terminal 30 of transistor 32, the emitter-collector junctions of transistors 32, 50 and 62 are essentially short circuits, and power supplies 34 and 36 are directly connected, respectively, to output terminals 18 and 20 of the gating circuit 12. The gating signals thus supplied to terminals 18 and 20 cause Zener diodes 86 and 88 to conduct in the forward direction and charge storage capacitor 90 while the voltage drops across diodes 86 and 88 bias the emitter junctions of transistors 74 and 80 in the reverse direction and cause those transistors to present an essentially infinitely large impedance to load terminals 22 and 24.

When a negative switching pulse is generated by the switching signal source 10, transistor 32 is biased in the reverse direction and virtually eliminates all current flow through resistors 42 and 44. This removes the previously existing forward bias voltage from the emitters of transistors 50 and 62 and cuts them off, thereby interposing a very large impedance between terminals 18 and 20 and the remainder of gating circuit 12. The current which still flows through silicon junction diodes 58 and 70, resistor 73, and the power supplies 34 and 36 after transistors 50 and 62 have been cut off creates a forward voltage drop across each of the diodes which gives the emitter of each transistor 50 and 62 a reverse bias. This reverse bias serves to further increase the impedance presented by each transistor between terminals 18 and 20 and the remainder of gating circuit 12.

When the negative switching pulse causes terminals 18 and 20 to become de-energized and isolated from the remainder of gating circuit 12, the charge stored in capacitor 90 biases Zener diodes 86 and 88 well into their Zener regions of operation. The voltage across each diode remains substantially constant and independent of current through it as long as it is operated in its Zener region. Thus, diodes 86 and 88 supply an essentially constant forward bias voltage to the emitter circuits of transistors 74 and 80. Since the resistance of resistors 92 and 96 is substantially greater than that of the forward-biased emitter junctions of transistors 74 and 80, the output current flow from the capacitor 90, through resistor 92, the emitter-collector junction of transistor 74, the load, the emitter-collector junction of transistor 80, resistor 96 and back to capacitor 90, is essentially independent of the collector voltages of transistors 74 and 80 and is a function only of the voltage across Zener diode 86 or 88 and the resistance of resistor 92 or 96. Bias resistor 100 provides a base current path for transistors 74 and 80. As a result, an essentially constant current flows into the load for as long as the voltage across the capacitor 90 is sufficient to maintain operation of Zener diodes 86 and 88 in the Zener region.

The net result of the transmission of a negative switching pulse from the source 10 to the base terminal 30 of transistor 32 is, then, that gating circuit terminals 18 and 20 and output terminals 22 and 24 are effectively isolated from the remainder of the gating circuit 12 and from switching signal source 10, while a constant current pulse is delivered to the load connected to terminals 22 and 24.

The load circuit 16 shown in the drawing includes the base terminal 102 and collector 104 of a four-electrode semi-conductor device 106. Semiconductor device 106 provides an essentially short circuit connection between its two emitter terminals 108 and 110 when a current is supplied to its base-collector junction. This device is shown being used as a switch in conjunction with a grounded source of modulating voltage 112 and a resistor 114 to provide a modulated carrier wave at the output terminal 116.

The above isolating and pulse-producing circuit can be operated over a very wide range of switching signal frequencies, e.g., from fewer than 10 to 100,000 or more cycles per second, while providing the desired isolation without adding capacitive coupling between the input and the output of the circuit. The circuit's reliability is dependent only upon the highly reliable semiconductor devices and other electrical components used in it.

The use of the circuit of this invention is especially advantageous in systems where several switching signal sources supply signals in sequence to a single output circuit. Since the circuit provides isolation of its output from its input when no signal is supplied from the source, the use of one such circuit with each input source would automatically isolate every source from the single output at all times. The circuit also has the fail-safe feature of isolating the system's output from each input until a signal is supplied. That is, malfunction of the input source will not create a possibly damaging output signal to the load.

Although a specific embodiment of the invention has been described, it is not intended to be exhaustive or limitative; on the contrary, it is intended to be merely illustrative. Therefore, anyone skilled in the art may make certain changes in the disclosed structure without deviating from the scope of the invention as defined in the claims.

I claim:

1. Electrical drive circuit means for producing output drive signals at drive circuit output terminals electrically isolated from a source of electrical input signals, said drive circuit means comprising, in combination, gating means having gating circuit output terminals, gating circuit input terminals, and gating circuit elements for presenting gating signals at said gating circuit output terminals when input signals of one polarity are applied to said gating circuit input terminals, and providing an essentially infinitely large impedance between each of said gating circuit output terminals and said gating circuit input terminals when input signals of said one polarity are not applied to said gating circuit input terminals, and control circuit means connected to said gating circuit output terminals and including said drive circuit output terminals and control circuit elements for providing an essentially infinitely large impedance between each of said drive circuit output terminals and said gating circuit output terminals and storing the electrical energy of said gating signals when said gating signals are present at said gating circuit output terminals, and delivering said stored electrical energy to said drive circuit output terminals when said gating signals are not present at said gating circuit output terminals.

2. Electrical circuit means for producing in a load circuit driving signals corresponding to and electrically isolated from switching signals generated by a signal source, said circuit means comprising: a source of electrical switching signals; a gating circuit connected to said source, said gating circuit having a pair of terminals and means connected to said terminals and said source for presenting at said terminals gating signals when switching signals are generated and an essentially infinitely large impedance when said switching signals are not generated; a control circuit connected to said terminals and said load circuit, said control circuit including: a pair of three-terminal semiconductor devices each of which has a first terminal, a second terminal connected to said load circuit, and a third terminal connected to one of said gating circuit terminals; and control means interconnecting both pairs of said first and third terminals of each of said semiconductor devices, said control means including capacitive means for storing the energy of said gating signals, said control means being responsive to said gating signals for transmitting said gating signals to said capacitive means and thereby storing the energy of said signals in said capacitive means, and for rendering said semiconductor devices essentially non-conducting and thereby presenting an essentially infinitely large impedance to each of said first semiconductor terminals, said control means also being actuable by said energy stored in said capacitive means, when said gating signals are not present at said gating circuit terminals, for rendering said semiconductor devices essentially fully conductive and maintaining essentially constant for a determinable length of time the resulting current flow from said capacitive means through each of said first and second semiconductor device terminals to said load circuit.

3. Electrical circuit means for producing in a load circuit driving signals corresponding to and electrically isolated from switching signals generated by a signal source, said circuit means comprising: a source of electrical switching signals; a gating circuit connected to said source, said gating circuit having a pair of terminals and means connected to said terminals and said source for presenting at said terminals gating signals when switching signals are generated and an essentially infinitely large impedance when said switching signals are not generated; a control circuit connected to said terminals and said load circuit, said control circuit including: a p-n-p transistor having its base terminal connected to a first one of said gating circuit terminals and its collector terminal connected to said load circuit; a first current limiting resistor having one end connected to the emitter terminal of said p-n-p transistor; a first zener diode having its cathode connected to the other end of said first limiting resistor and and its anode connected to said first terminal of said gating circuit; a capacitor having one end connected to said cathode of said first zener diode; a second zener diode having its anode connected to the other end of said capacitor and its cathode connected to a second one of said gating circuit terminals; a second current limiting resistor having one end connected to said anode of said second zener diode; a n-p-n transistor having its base terminal connected to said second gating circuit terminal, its collector terminal to said load circuit, and its emitter terminal to the other end of said second limiting resistor; and a transistor bias resistor having each end connected to one of said terminals of said gating circuit.

4. Electrical circuit means for producing in a load circuit driving signals corresponding to and electrically isolated from switching signals generated by a signal source, said circuit means comprising: a source of electrical switching signals; a gating circuit connected to said source, said gating circuit comprising: first and second direct current power supplies with the negative terminal of said first supply connected to the positive terminal of said second supply; a voltage-divider network connected to the other terminals of said power supplies; a first n-p-n transistor having its base terminal connected to said signal source and said voltage-divider network; a first bias resistor having one end connected to the collector of said first n-p-n transistor and its other end to the positive terminal of said first power supply; a second bias resistor having one end connected to the emitter of said first n-p-n transistor and to the negative terminal of said second power supply; a first semiconductor diode having its anode connected to said positive terminal of said first power supply; a p-n-p transistor having its emitter connected to the cathode of said first semiconductor diode, its collector to one of a pair of gating circuit output terminals, and its base terminal connected through a current limiting resistor to said collector of said first n-p-n transistor; a second n-p-n transistor having its collector connected to the other of said gating circuit output terminals and its base connected through a current limiting resistor to said emitter of said first n-p-n transistor; a second semiconductor diode having its anode connected to the emitter of said second n-p-n transistor and its cathode to said negative terminal of said second power supply; and a relatively large current limiting resistor connected between said emitters of said p-n-p and second n-p-n transistors, whereby said gating circuit presents at said gating circuit output terminals gating signals when switching signals are generated by said switching signal source and an essentially infinitely large impedance when said switching signals are not generated; a control circuit connected to said terminals and said load, said control circuit including: a pair of three-terminal semiconductor devices each of which has a first terminal, a second terminal connected to said load circuit, and a third terminal connected to one of said gating circuit terminals; and control means interconnecting both pairs of said first and third terminals of each of said semiconductor devices, said control means including capacitive means for storing the energy of said gating signals, said control means being responsive to said gating signals for transmitting said gating signals to said capacitive means and thereby storing the energy of said signals in said capacitive means, and for rendering said semiconductor devices essentially non-conducting and thereby presenting an essentially infinitely large impedance to each of said first semiconductor terminals, said control means also being actuable by said energy stored in said capacitive means, when said gating signals are not present at said gating circuit terminals, for rendering said semiconductor devices essentially fully conductive and maintaining essentially constant for a determinable length of time the resulting current flow from said capacitive means each of said first and second semiconductor device terminals to said load circuit.

5. Electrical drive circuit means for producing in a load circuit driving signals corresponding to switching signals generated by a switching signal source and electrically isolated from all circuits common to said source, said drive circuit means comprising, in combination: a gating circuit and a control circuit, said gating circuit including input terminals for receiving said switching signals, gating circuit output terminals, and gating circuit semiconductor elements, said gating circuit elements being normally essentially non-conducting and presenting a substantially infinitely large impedance at said gating circuit output terminals, said gating circuit elements also being responsive to the application to said gating circuit input terminals of switching signals of one polarity for conducting gating signals to said gating circuit output terminals, said control circuit being connected to said gating circuit output terminals and having control circuit output terminals, control circuit semiconductor elements, and electrical energy storage means, said control circuit elements being responsive to the appearance of gating signals at said gating circuit output terminals to electrically isolate said gating circuit output terminals from said control circuit output terminals and store electrical energy in said storage means, said control circuit elements being adapted to produce said driving signals by delivering energy from said storage means to said control circuit output terminals when said gating signals of said one polarity do not appear at said gating circuit output terminals.

References Cited by the Examiner

UNITED STATES PATENTS

| | | | |
|---|---|---|---|
| 2,563,816 | 8/51 | Butman | 328—67 X |
| 2,789,217 | 4/57 | Lacy | 328—67 X |
| 2,863,123 | 12/58 | Koch | 307—88.5 |
| 3,031,588 | 4/62 | Hilsenrath | 307—88.5 |

ARTHUR GAUSS, *Primary Examiner.*